United States Patent
Rockwell

[11] Patent Number: 6,046,412
[45] Date of Patent: Apr. 4, 2000

[54] HEAVY DUTY WEIGH SCALE

[76] Inventor: Daniel J. Rockwell, 47 Sun River, Cascade Rd., Sun River, Mont. 59483

[21] Appl. No.: 09/199,919

[22] Filed: Nov. 25, 1998

Related U.S. Application Data

[60] Provisional application No. 60/066,544, Nov. 27, 1997.

[51] Int. Cl.[7] ............................................... G01G 19/02
[52] U.S. Cl. ......................... 177/133; 177/134; 177/199; 177/DIG. 9
[58] Field of Search .................................. 177/132, 133, 177/134, 135, 199, 201, DIG. 9

[56] References Cited

U.S. PATENT DOCUMENTS

| | | | |
|---|---|---|---|
| 3,741,328 | 6/1973 | Anderson et al. | 177/21 OR |
| 3,747,716 | 7/1973 | Wilson | 177/134 |
| 3,797,593 | 3/1974 | Conley | 177/134 |
| 3,935,914 | 2/1976 | Nordstrom et al. | 177/134 |
| 4,066,140 | 1/1978 | Conley | 177/134 |
| 4,203,497 | 5/1980 | Harris et al. | 177/134 |
| 4,516,645 | 5/1985 | Wetzel | 177/147 |
| 4,549,622 | 10/1985 | Leiman | 177/134 |
| 4,609,062 | 9/1986 | Hale et al. | 177/256 |
| 4,627,507 | 12/1986 | Powell et al. | 177/211 |
| 4,733,736 | 3/1988 | Holtgreven et al. | 177/255 |
| 4,744,429 | 5/1988 | Kellenbach | 177/211 |
| 4,800,971 | 1/1989 | Dillon et al. | 177/134 |
| 4,828,055 | 5/1989 | Hamilton et al. | 177/134 |
| 4,887,678 | 12/1989 | Largenton | 177/134 |
| 5,224,561 | 7/1993 | Ahl | 177/163 |

*Primary Examiner*—Randy W. Gibson
*Attorney, Agent, or Firm*—Richard C. Conover

[57] ABSTRACT

A heavy duty weigh scale including a rectangular weighing platform constructed of parallel and spaced apart I-beams, which platform is carried above ground with at least one stand supporting an I-beam of the platform. The stand having a pair of spaced apart upright supports of approximately the same length for supporting a load cell. The weight of the platform and object being weighed being directed to the load cell through a weight-transfer link connected to the platform. The weight-transfer link being located in a cut-out opening provided in the web of the I-beam supported by the stand.

6 Claims, 3 Drawing Sheets

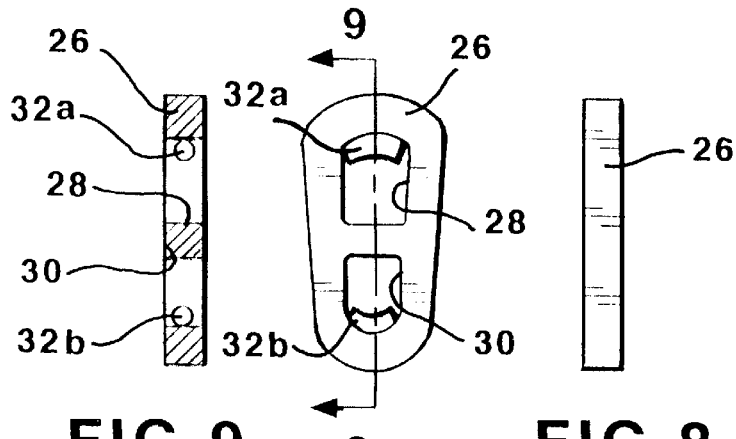
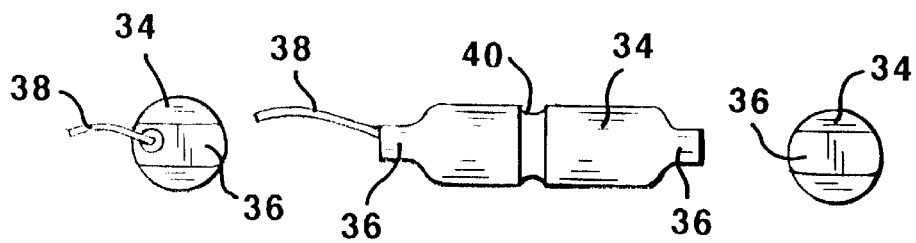
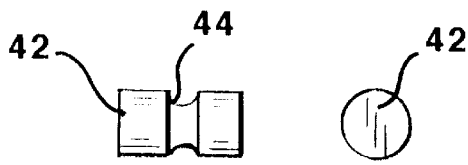
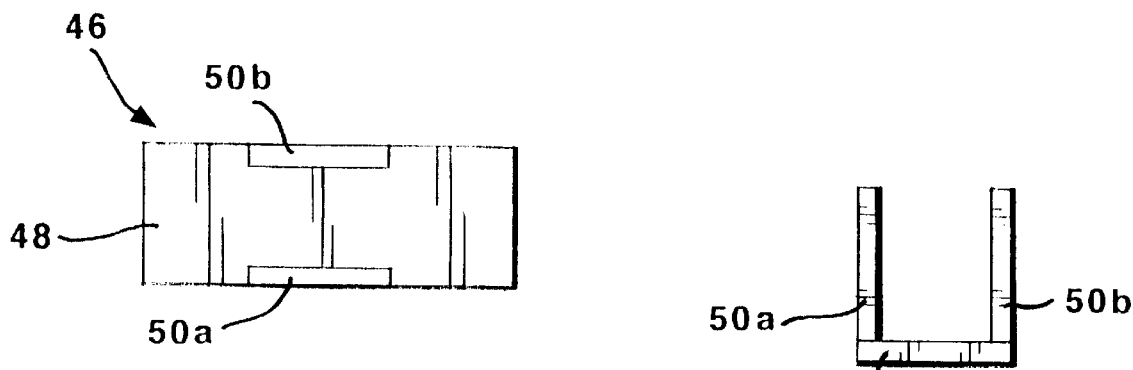

HEAVY DUTY WEIGH SCALE

This is a continuation of provisional application No. 60/066,544 filed on Nov. 27, 1997.

SPECIFICATION

BACKGROUND OF THE INVENTION

This invention relates to an industrial weigh scale that determines the weight of an object when the object is placed on a weighing platform, and in particular to a weighing apparatus that determines total weight on the apparatus by using a plurality of load-indicating transducers for rapid weight determination.

U.S. Pat. No. 4,066,140 is representative of the prior art that has addressed apparatus associated with heavy-duty industrial scales. This patent describes load-indicating transducers mounted adjacent each of the four corners of a rectangular weighing platform constructed of spaced apart and parallel I-beams. As this patent points out in its BACKGROUND statement, "a major portion of the expense of an industrial scale is directly related to the height of the scales". Even though the '140 patent addressed this height problem, the invention described did not solve this problem, because adjacent each corner of the weighing platform, a complete load-indicating transducer assembly is located on a base underneath an associated I-beam.

U.S. Pat. No. 4,549,622 attempts to solve this problem by placing some of the load-indicating transducer components up within a weakened beam that has been notched. This solution will work for relatively light loads, but leaves a considerable uncertainty as to when the weighing platform will break as the loads get heavier. Notching a beam forms a weak point that will undoubtedly break before the rest of the beam if the load gets heavy enough.

Another patent, U.S. Pat. No. 4,828,055, attempted to solve the height problem by placing the load-indicating transducers between individual, pivotally supported, sections making up a complete weighing platform. This patent suffers from a construction problem in that the load measuring apparatus is positioned between the pivotally supported sections. This apparatus is not adapted to be used with conventional I-beams, which do not pivot, although these I-beams are generally used in a conventional weighing platform. Conventional I-beams have a very definite advantage in constructing a weighing platform because they are readily available and are in widespread use.

From the above, it can be seen that what is needed is a heavy duty weigh scale that can be constructed with conventional I-beams and still have a compact height from ground to the top of the weighing platform.

SUMMARY OF INVENTION

A generally rectangular platform is constructed of a plurality of parallel and spaced apart I-beams. A double-ended shear beam load cell is positioned adjacent each of the four corners of the platform. The load cells provide an electrical output signal responsive to the weight of the object being weighed. The output signals of the four load cells are summed to provide an indication of the total weight of the load resting on top of the platform.

The platform rests on four stands, located at each corner of the platform. Each stand includes a base and a pair of upright supports extending upward from opposite sides of the base toward the platform.

Each I-beam located at each corner of the platform has a cut-out opening in a web of the I-beam. The opening extends into a slot provided in the bottom flange of the I-beam. Several braces are fixedly attached between the bottom flange and the upper flange adjacent the opening in the web.

A weight-transfer link having a pair of vertically spaced openings is positioned within the cut-out opening of the web and the slot provided in the bottom flange. The upper opening is positioned above the bottom flange and the lower opening is positioned below the bottom flange.

Each load cell is provided with flattened ends. Each load cell is positioned within the respective upper opening of the weight-transfer link with the opposite, flattened ends of the load cell resting on top of the spaced-apart, upright supports of the stand. A pin is inserted through the lower opening provided in the weight-transfer link. With this configuration, the bottom of the lower flange presses against the pin. The pressure on the pin is transferred through the weight-transfer link to the load cell.

As a load is placed on the weighing platform, the weight of the load is directed to the load cell. By summing the outputs of the four load cells, the total weight placed on the weighing platform can be determined.

BRIEF DESCRIPTION OF THE DRAWINGS

In order that the invention may be clearly understood and readily carried into effect, a preferred embodiment of the invention will now be described, by way of example only, with reference to the accompanying drawings wherein:

FIG. 7 is an elevational view of a weight-transfer link shown in FIG. 2;

FIG. 8 is a right side view of the weight-transfer link shown in FIG. 7;

FIG. 9 is a cross-sectional view taken along the line 9—9 of the weight-transfer link shown in FIG. 7;

FIG. 10 is an elevational view of a load cell shown in FIG. 3;

FIG. 11 is a right side view of the load cell shown in FIG. 10;

FIG. 12 is a left side view of the load cell shown in FIG. 10;

FIG. 13 is an elevational view of a pin shown in FIG. 3;

FIG. 14 is a right side view of the pin shown in FIG. 13;

FIG. 15 is a top plan view of a stand shown in FIG. 2; and

FIG. 16 is a right side view of the stand shown in FIG. 15.

DESCRIPTION OF A PREFERRED EMBODIMENT

Figure 1:
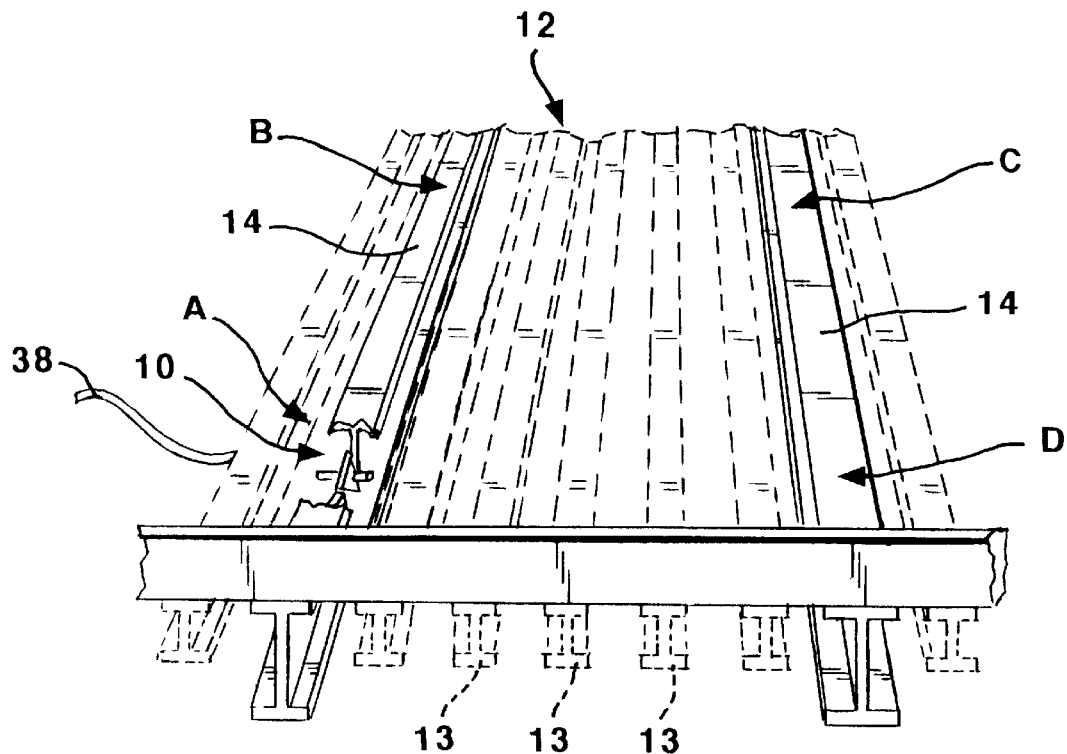
FIG. 1 is a perspective view of a platform weighing apparatus according to the present invention.

FIG. 1 illustrates a heavy-duty scale platform 12 constructed with a plurality of parallel spaced apart I-beams 14. Weight-measuring supports 10 are positioned adjacent the four corners of the platform, specifically at locations "A", "B", "C" and "D" as shown in FIG. 1. The weight-measuring supports 10 include load cells 34 which provide an electrical output signal responsive to the weight of the object being weighed. The output signals of the four load cells 34 are summed to provide an indication of the total weight of the load resting on top of the platform. An enlarged, elevational view of one such weight-measuring support 10 is shown in FIGS. 2 and 3.

Figure 2:
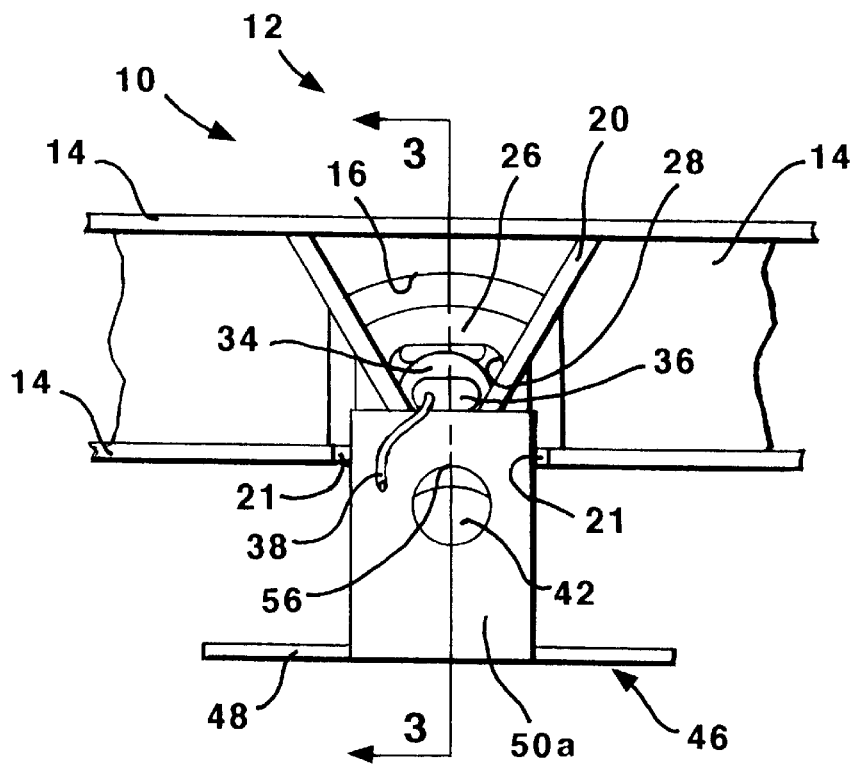
FIG. 2 is an enlarged, elevational view of a platform weighing apparatus shown in FIG. 1.
Figure 3:
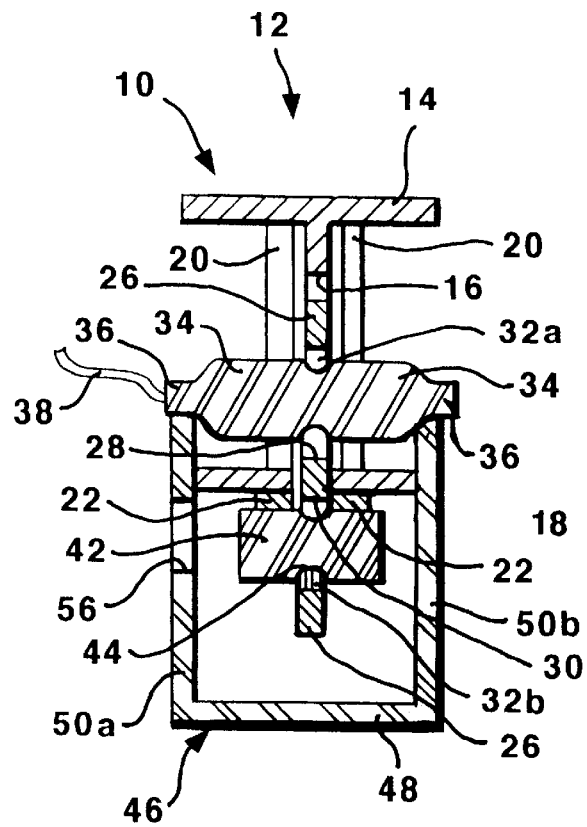
FIG. 3 is a cross-sectional view taken along the line 3—3 of the platform weighing apparatus shown in FIG. 2.

The platform 12 rests on a stand 46 provided at each of the locations "A", "B", "C", and "D", as shown in FIG. 2. The stand 46 includes a flat base plate 48, as best seen in FIG. 2. Upright supports 50a and 50b are fixedly secured to base plate 48. The supports 50a and 50b are of substantially the same length. One of the supports, 50a, has a hole 56 cut through it as best seen in FIG. 3.

Figure 4:
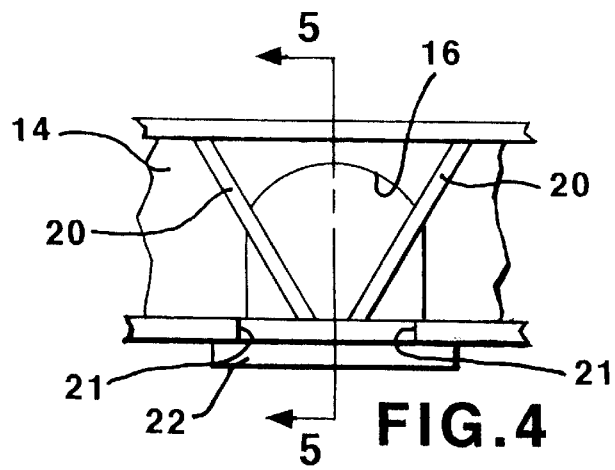
FIG. 4 is an elevational view of an I-beam shown in FIG. 2.
Figure 5:
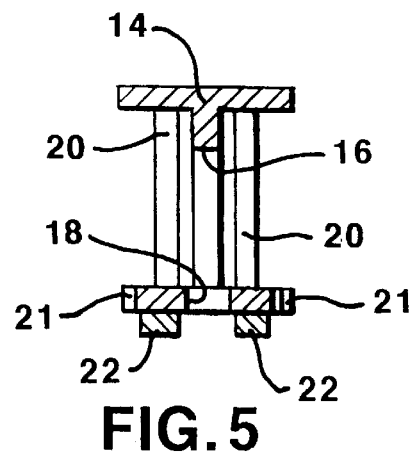
FIG. 5 is a cross-sectional view taken along the line 5—5 of the I-beam shown in FIG. 4.
Figure 6:
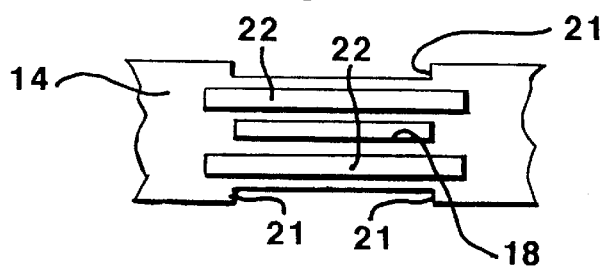
FIG. 6 is a bottom plan view of the I-beam shown in FIG. 4.

As best seen in FIGS. 4–6, each I-beam 14 located at positions "A", "B", "C" and "D", has a cut-out opening 16 in the center web of the I-beam. A slot 18 is also cut through the bottom flange of I-beam 14 as shown in FIGS. 5 and 6 with slot 18 opening into opening 16. Slot 18 is positioned beneath opening 16 and formed parallel with the web of the I-beam. Notches 21 are cut in the bottom flange on opposite sides of the web.

Several braces 20 are welded on either side of opening 16 to the upper and bottom flanges, as shown in FIG. 4, to further strengthen the I-beam adjacent opening 16. On the bottom flange of I-beam 14, spacers 22 are welded on opposite sides of slot 18.

A weight-transfer link 26, having a pair of openings 28 and 30, is positioned within the opening 16 and slot 18 of I-beam 14 as shown in FIGS. 2 and 3. A detail view of link 26 is shown in FIGS. 7–9. A curved piece of hardened, round stock 32a is welded against the top surface of the upper opening 28. A second, curved piece of hardened, round stock 32b is also welded against the bottom surface of lower opening 30. Round stock 32a and 32b are used to reduce wear at their respective locations.

Slot 18 and opening 16 in I-beam 14 are sized to accept weight-transfer link 26 in the position shown in FIGS. 2 and 3, with considerable extra room added to allow weight-transfer link 26 to easily move both side-to side, or fore-and-aft, when placed in opening 16.

After link 26 is installed as shown in FIGS. 2 and 3, a double-ended shear beam load cell 34 is inserted through upper opening 28 as shown in FIGS. 2 and 3. Load cell 34 is conventional and in a preferred embodiment is an Artech Industries Inc. Model 70210 Double Ended Shear Beam. Load cell 34 has flattened ends 36 as shown in FIGS. 10–12. Upright supports 50a and 50b, as shown in FIG. 3, are spaced apart sufficiently to receive load cell 34 with each flattened end 36 of load cell 34 positioned on a respective upper surface of uprights 50a and 50b, as shown in FIG. 3.

A groove 40, as best seen in FIG. 10, is conventionally provided intermediate the ends of load cell 34. Groove 40 receives hardened round stock 32a of weight-transfer link 26 as shown in FIG. 3.

After load cell 34 is installed as shown in FIGS. 2 and 3, a pin 42 is installed through lower opening 30 of link 26 as shown in FIG. 3. Pin 42 in this position rests below spacers 22 secured to the bottom flange of I-beam 14. Pin 42, which in a preferred embodiment is made of steel, has a round, cylindrical shape as best seen in FIGS. 13 and 14. Pin 42 has sufficient length to extend across both spacers 22 when placed in lower opening 30. Intermediate the ends of pin 42, a groove 44 is formed around a circumference of the pin as shown in FIG. 13. Groove 44 receives hardened round stock 32b of weight-transfer link 26 to as shown in FIG. 3.

The assembly of a weight-measuring support 10 is best seen in FIGS. 2 and 3. A conventional jack (not shown) is placed under I-beam 14 in a position slightly away from a location such as "A" so as to not interfere with the eventual coupling of stand 46 to the I-beam. I-beam 14 is then jacked upwardly. When there is sufficient space under I-beam 14, the top of weight-transfer link 26 is inserted through slot 18 into opening 16. Load cell 34 is then inserted through upper opening 28 of weight-transfer link 26 until stock 32a, located in opening 28, rests in groove 40 of load cell 34.

I-beam 14 is then jacked upwardly further until stand 46 can be placed under the I-beam. Upright supports 50a and 50b are placed in notches 21 provided in the bottom flange of I-beam 14. The supports 50a and 50b are further positioned beneath flattened ends 36 of load cell 34. The jack is slowly lowered so that supports 50a and 50b engage flatten ends 36 and hold load cell 34 in the desired position as shown in FIGS. 2 and 3. As the jack is lowered still further, hole 56 soon becomes aligned with lower opening 30 in weight-transfer link 26. Pin 42 is then inserted through hole 56 into opening 30 so that round stock 32b engages groove 44 surrounding the pin. As the jack is lowered further, spacers 22 then press against pin 42. Weight-measuring support 10 is now fully assembled. The jack at this time can now be completely collapsed and removed.

In operation, as weight is placed on I-beams 14, I-beams 14 deflect downwardly. Pin 42, resting against spacers 22, also pulls weight-transfer link 26 downwardly. Flattened ends 36 of load cell 34 are held fixed relative to the ground by supports 50a and 50b. Weight-transfer link 26 pulls the center of load cell 34 downwardly according to the weight supported by I-beam 14. Deflected load cell 34 then provides an output voltage, proportional to the weight applied, through cord 38 to a conventional output display device (not shown).

Since weight-transfer link 26 is suspended between round stock 32a riding in groove 40 of load cell 34 and round stock 32b riding in groove 44 of pin 42, and because slot 18 and opening 16 have been sized to permit weight-transfer link 26 to move from side-to-side or fore-and-aft, any such moving of platform 12 caused by a shifting load on platform 12 is accommodated by weight-measuring support 10 without affecting the weight measurement.

The output voltages of load cells 34 at locations "A", "B", "C", and "D" may be summed to provide an indication of the total weight of the load resting on platform 12.

With this construction of weight-measuring supports 10, the height of the platform 12 above ground may be substantially reduced.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A heavy duty weigh scale comprising:
    a weighing platform constructed of parallel and spaced apart I-beams, each I-beam having a web extending between an upper and a bottom flange;
    at least one stand supporting an I-beam of the platform carrying the platform above ground;
    each stand having a base plate and a pair of spaced apart upright supports of approximately the same length, the upright supports being spaced apart sufficiently to receive the bottom flange of said I-beam supported by the stand;

the I-beam supported by the stand includes a cut-out through the web, which cut-out opens into a slot in the bottom flange, the slot extending beneath the cut-out and parallel with the web of said I-beam;

a weight-transfer link having an opening therethrough;

the weight-transfer link sized to fit within the cut-out and slot provided in said I-beam supported by the stand;

the weight-transfer link positioned within the cut-out and slot provided in said I-beam with the opening of the link extending above the bottom flange into the cut-out through the web and also extending below the slot provided in the bottom flange;

a double-ended shear beam load cell positioned through the opening of the weight-transfer link above the bottom flange, and having each end resting on a respective upright support of the stand; and an elongate pin positioned through the opening of the weight-transfer link below the load cell and below the slot in the bottom flange of the said I-beam supported by the stand, the pin having a length greater than the transverse dimension of the slot.

2. The weigh scale of claim 1 further including a brace fixedly secured to the upper and bottom flanges of said I-beam supported by the stand, the brace positioned adjacent the cut-out provided in the web of said I-beam.

3. The weigh scale of claim 1 further including a pair of spacers fixedly attached to a lower side of the bottom flange on either side of the slot provided in said I-beam supported by the stand and positioned to abut the pin positioned in the opening of the weight-transfer link.

4. The weigh scale of claim 3 wherein both the load cell and the pin each have a circumferential groove intermediate the ends to receive the weight-transfer link in each of these circumferential grooves.

5. The weigh scale of claim 4 further including an upper wear-resistant member fixedly secured adjacent the upper end of the opening provided in the weight-transfer link, the upper wear-resistant member positioned within the circumferential groove on the load cell, and a lower wear-resistant member fixedly secured adjacent a lower end of the opening provided in the weight-transfer link, the lower wear-resistant member positioned within the circumferential groove on the pin.

6. The weigh scale of claim 5 wherein one of the upright supports of the stand has a hole therethrough which is sized to permit the pin to be inserted through this hole into the weight-transfer link opening.

\* \* \* \* \*